United States Patent [19]
Hudson et al.

[11] Patent Number: 5,970,997
[45] Date of Patent: Oct. 26, 1999

[54] SMART ACTUATOR CONTROL

[75] Inventors: Hugh F. Hudson; Dennis J. Ulicny, both of Waukesha; David R. Fuhr, Menomonee Falls, all of Wis.; Kevin A. Weiss, Gurnee, Ill.; David C. Ritmanich, Brookfield; Peter J. Klomberg, Horicon, both of Wis.

[73] Assignee: Johnson Service Company, Milwaukee, Wis.

[21] Appl. No.: 08/865,455

[22] Filed: May 29, 1997

Related U.S. Application Data

[63] Continuation-in-part of application No. 08/683,737, Jul. 17, 1996, Pat. No. 5,758,684, which is a continuation-in-part of application No. 08/388,722, Feb. 15, 1995, abandoned.

[51] Int. Cl.$^6$ ........................................ F16K 51/00
[52] U.S. Cl. .................................. 137/1; 251/129.11
[58] Field of Search .................. 251/129.11, 129.12, 251/129.13; 137/1

[56] References Cited

U.S. PATENT DOCUMENTS

| | | |
|---|---|---|
| 1,784,094 | 12/1930 | Fletcher . |
| 2,674,903 | 4/1954 | Doster . |
| 2,930,571 | 3/1960 | Vogl . |
| 4,090,589 | 5/1978 | Fitzwater . |
| 4,113,063 | 9/1978 | Troy . |
| 4,440,382 | 4/1984 | Pruvot et al. . |
| 4,533,114 | 8/1985 | Cory et al. . |
| 4,621,789 | 11/1986 | Fukamachi . |
| 4,741,508 | 5/1988 | Fukamachi . |
| 4,881,420 | 11/1989 | Paul, Jr. . |
| 4,920,811 | 5/1990 | Hopper . |
| 5,182,498 | 1/1993 | Stuhr . |
| 5,310,021 | 5/1994 | Hightower . |
| 5,518,462 | 5/1996 | Yach . |
| 5,831,406 | 11/1998 | Bleibinhaus et al. .......... 251/129.12 X |

Primary Examiner—Kevin Lee
Attorney, Agent, or Firm—Quarles & Brady LLP

[57] ABSTRACT

An apparatus for effecting actuation of a positioning member and a method for commissioning the apparatus wherein the apparatus includes a controller coupled to a drive motor and adapted to receive an input signal and to apply positioning signals to the drive motor. The positioning signals selectively effect positioning of the positioning member and determine a first position and a second position of the positioning member. The method for commissioning the apparatus selectively includes performing an end stop determination sequence in response to an end stop determination signal, winding a bias member, and determining a range of rotation for the positioning member. The end stop determination sequence seeks to detect the presence of both a load and spring when rotating the positioning member and biasing member, respectively, in one of a first and second direction. The load and spring are detected, if present, by monitoring the rotation of the positioning member and bias member, respectively, to detect a stall before the positioning member and biasing member, respectively, exceed a predetermined position. Similarly, during the wind spring sequence and range sequence, the rotation of the biasing member and positioning member, respectively, are monitored for a stall that indicates that the biasing member is cocked and the end stop of the positioning member is determined, respectively.

25 Claims, 12 Drawing Sheets

SMART ACTUATOR CONTROL

CROSS-REFERENCE TO RELATED APPLICATIONS

This application is a continuation-in-part of U.S. application Ser. No. 08/683,737, filed Jul. 17, 1996, U.S. Pat. No. 5,758,684, which is a continuation-in-part of U.S. patent application Ser. No. 08/388,722, filed Feb. 15, 1995, now abandoned. This application is related to commonly assigned U.S. Application filed of even date herewith and entitled "Transmission for a Return-To-Normal Actuator" the disclosure of which is hereby expressly incorporated herein by reference.

BACKGROUND OF THE INVENTION

The invention relates generally to an actuator. In particular, the invention relates to an electromechanical actuator for actuating a valve or damper in a fluid distributing system, such as an air conditioning system or a heating system where the actuator must return the valve or damper to a "home" position when power is lost (return-to-normal). Conventional prior art return-to-normal actuators contain a return spring that is almost always coupled to the gear train that transmits power from a drive motor to the output which effects actuation. Because the spring in such a device is always in the gear train, a large drive motor and robust gears are required to supply appropriate torque to drive the load experienced because of the valve or damper being actuated, and also to supply torque to oppose the torque of the spring. As motor size increases, motor current draw also increases. Generally, motor cost also increases with motor size. Such increased current causes thermal problems for the actuator, for the drive electronics, and for the motor. Further, in such prior art devices where the spring is always coupled to the gear train, the spring is cycled every time the drive motor is cycled, thereby presenting significant fatigue problems for the spring. Typically, the life of such prior art return-to-normal actuators is limited by the fatigue life of the spring.

It would, therefore, be useful to have a return-to-normal actuator for use with valves, dampers, or other actuation environments which initially winds a spring or other bias device and then decouples that spring from the gear train. Such a device would allow the motor to drive only the load provided by the damper, valve, or other device being actuated during normal operation. Once power to the actuator is removed, the spring is recoupled to the gear train and the spring drives the output shaft to its predetermined normal position.

SUMMARY OF THE INVENTION

The invention is an apparatus for effecting actuation of a device. The device has a certain range of operation and a home position and a set position within that range, and the apparatus returns the device to the home position upon loss of power to the apparatus. In its preferred embodiment, the apparatus comprises a drive motor for providing a driving force to a drive shaft, and a bias member having a cocking mechanism and a release mechanism. The bias member provides a bias force to a bias shaft when the cocking mechanism is cocked and the release mechanism is released; the release mechanism is released when power is lost to the actuator. The preferred embodiment of the apparatus further comprises a drive member which delivers an actuating force to an actuating shaft in response to forces received on an input shaft. Still further, the apparatus preferably comprises a transmission mechanism coupled with the drive shaft, with the bias shaft, and with the input shaft. The transmission mechanism delivers the driving force to the bias shaft when the input shaft is locked. The transmission member delivers the driving force to the input shaft when the bias shaft is locked. The transmission mechanism delivers the bias force to the input shaft when the drive shaft is locked and the power is lost to the actuator.

In the preferred embodiment, the bias member comprises a spring and the cocking mechanism comprises a solenoid brake which is set when the spring is wound. In this embodiment, the release mechanism engages the brake and is responsive to the power provided to the apparatus; the release mechanism releases the brake when the power is lost.

Further in the preferred embodiment of the present invention, the transmission mechanism includes a planetary gear assembly having a first input-output shaft coupled with the drive shaft, a second input-output shaft coupled with the bias shaft, and a third input-output coupled with the input shaft.

One element of a practical embodiment of the invention is employment of a speed limiting device during the return-to-normal cycle. The bias member may drive the valve or damper at a speed high enough to cause damage when the home position is reached. To prevent this, a speed limiting device in the form of a dynamic brake may be included in the apparatus that applies a retarding torque to counter the force provided by the bias member. The amount of such retarding torque may be directly proportional to the speed at which the bias member drives the bias shaft. One such dynamic brake is a centrifugal brake which is coupled to the bias shaft and is driven by a dedicated gear train. The dedicated gear train may, for example, step up the speed of the bias shaft from about 5 rpm to about 1,000 rpm.

In such an arrangement which uses a centrifugal brake, the brake which locks the bias shaft in position once the spring is wound up actually engages the centrifugal brake. This is advantageous because the braking torque required at the centrifugal brake in such a configuration is much lower than the braking torque which would be required if the centrifugal brake were engaged directly with the bias shaft. Thus, a smaller brake may be employed when the centrifugal brake is coupled as indicated with respect to the brake which locks the bias shaft.

In an alternate embodiment of the present invention, the transmission mechanism employs a differential gear mechanism having a first input-output shaft coupled with the drive shaft, a second input-output shaft coupled with the bias shaft, and a third input-output coupled with the input shaft.

In still another embodiment of the present invention, the apparatus includes a controller adapted to selectively apply positioning signals to the drive motor to effect positioning of the positioning member in response to an input signal and, alternatively, to determine a first position and a second position of the positioning member.

It is, therefore, an object of the present invention to provide an apparatus for effecting actuation of a device which employs a single motor for providing drive force and for setting a bias member, such as a spring.

A further object of the present invention is to provide an apparatus for effecting actuation of a device which decouples the bias member from the gear train to allow the drive motor to drive only the actuator output shaft during normal operation.

A still further object of the present invention is to provide an apparatus for effecting actuation of a device which automatically allows the bias member to be coupled to the gear train and drive the output shaft to a predetermined home position upon loss of power to the apparatus.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
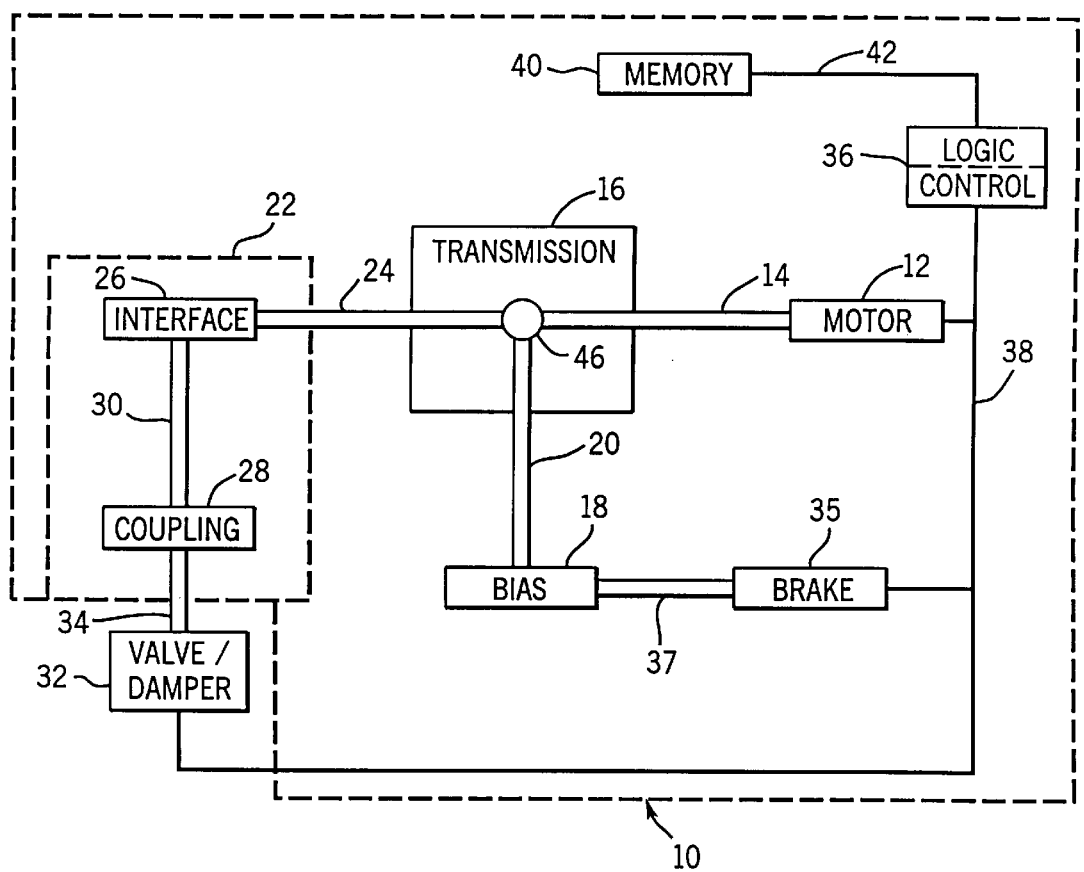
FIG. 1 is a schematic block diagram of the preferred embodiment of the present invention.

FIG. 1 is a schematic block diagram of the preferred embodiment of the present invention.

In FIG. 1, an apparatus 10 is illustrated as including a drive motor 12 connected by a drive shaft 14 to a transmission member 16. Transmission member 16 includes a planetary gear head assembly 46. Transmission member 16 is connected with a bias member 18 via a bias shaft 20, and is connected with a drive member 22 via an input shaft 24.

For purposes of this disclosure, the term "shaft" is intended to include any mechanical coupling such as a solid or hollow shaft, a flexible coupling, a gear train, or the like.

Drive member 22 includes an interface 26 to which input shaft 24 is coupled, and a coupling 28 which is connected with interface 26 via a shaft 30. Drive member 22 is connected with an actuated device, such as a valve or damper 32. The connection between valve 32 and drive member 22 is effected by an actuating shaft 34. A brake 35 is coupled with bias member 18 via a coupling 37. A logic/control device 36 is coupled via a network 38 with drive motor 12 and brake 35. Logic/control device 36 may also be coupled with valve 32. A memory 40 is coupled with logic/control device 36 via a line 42.

Figure 2:
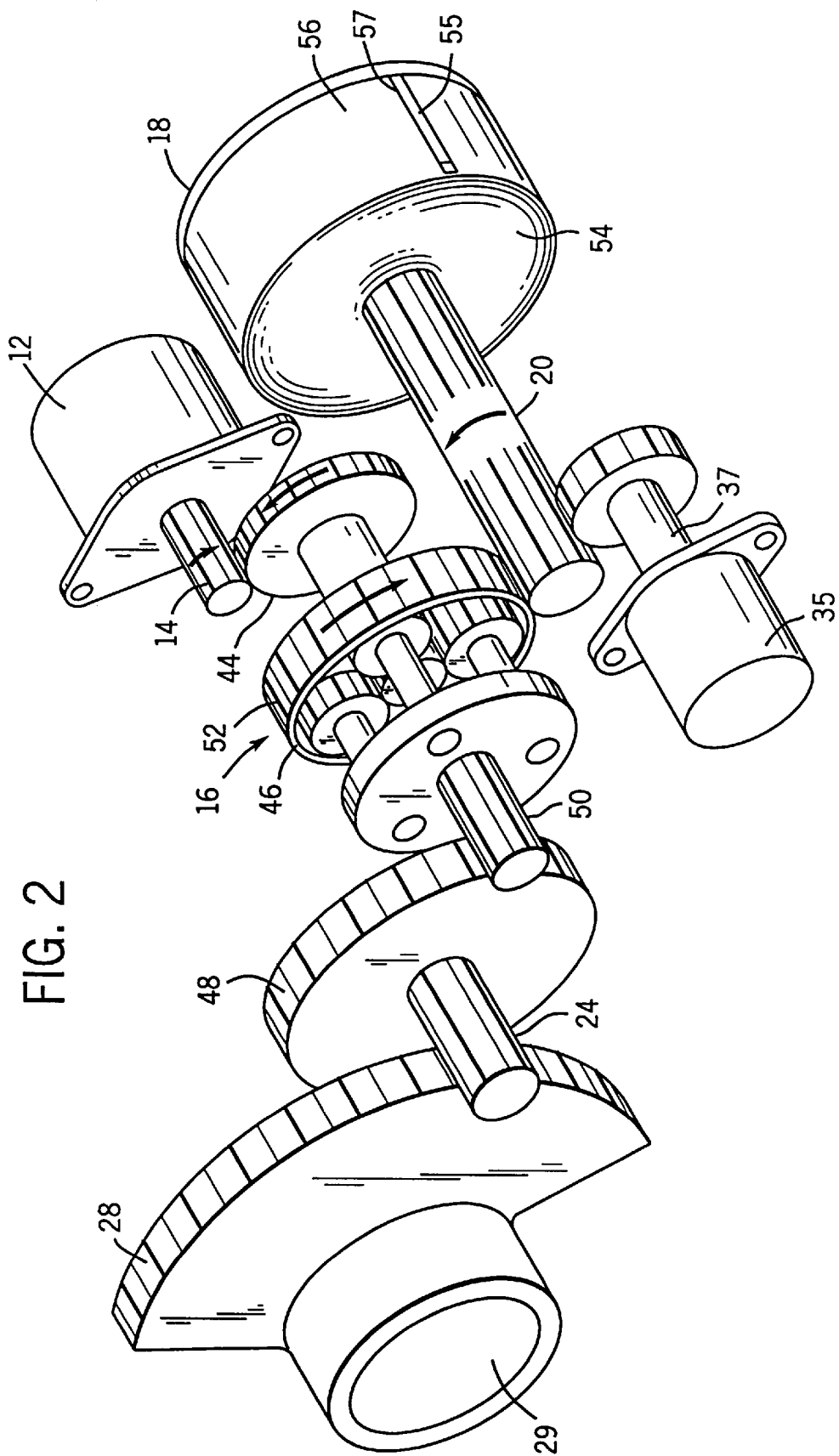
FIG. 2 is a schematic perspective illustration of details of the drive train of the preferred embodiment of the present invention when the input shaft is locked and the motor is winding the spring.

FIG. 2 is a schematic perspective illustration of details of the drive train of the preferred embodiment of the present invention when the input shaft is locked and the motor is winding the spring.

In order to facilitate understanding the present invention, like elements will be indicated using like reference numerals in the various drawings.

In FIG. 2, drive motor 12 rotates drive shaft 14 to transmit rotational force to transmission member 16. Transmission member 16 is coupled with bias shaft 20; bias shaft 20 is connected with bias member 18. A brake 35 is coupled via a coupling 37 with bias member 18; in the embodiment illustrated in FIG. 2, coupling 37 is connected with bias member 18 via bias shaft 20. Transmission member 16 is further connected with input shaft 24 which transmits rotational forces to coupling 28 for further transfer via actuating shaft 34 (not shown in FIG. 2). Coupling 28 is representatively illustrated as a sector gear in FIG. 2. Actuating shaft 34 is preferably configured for coupling with coupling 28 via an aperture 29 in order to establish connection between valve 32 (not shown in FIG. 2) and actuator 28.

Of particular interest in FIG. 2 is the illustration of the preferred embodiment of transmission member 16. In particular, transmission member 16 is comprised of a drive gear 44 which is engaged with drive shaft 14. Drive gear 44 receives rotational force imparted by drive shaft 14 and transmits that rotational force to a planetary gear head assembly 46. Planetary gear head assembly 46 interacts with a transmission gear 48 via a shaft 50 to impart rotational motion to input shaft 24 under appropriate circumstances to be described in greater detail hereinafter.

As previously established, FIG. 2 illustrates details of the drive train embodying transmission member 16 of the preferred embodiment of the present invention when input shaft 24 is locked. Input shaft 24 may become locked during particular operations of apparatus 10 (FIG. 1) such as when valve 32 is fully traveled to one extreme or the other of its available travel. Such movement by a valve to an extreme of its available travel may occur, for example, when valve 32 reaches a predetermined home position or a predetermined upper limit set position.

In operation, such a home position may, for example, be a normally open or a normally closed position establishing one extreme of the travel of valve 32. The set position may be any position other than the home position, but commonly is the other extreme of travel of the valve 32 from its predetermined home position. Thus, when an extreme of travel of valve 32 is reached, actuating shaft 34 (FIG. 1) cannot further rotate in the direction urging valve 32 toward its limit. Consequently coupling 28 and input shaft 24 are effectively locked. It is under such conditions that the characteristics of planetary gear head assembly 46 are advantageously employed in the present invention.

A planetary gear head assembly operates to transmit rotation forces among its input/output couplings, depending upon which of those input/output couplings may be locked. In the situation illustrated in FIG. 2 planetary gear head 46 has three input/output couplings: drive shaft 14, bias shaft 20, and input shaft 24. When input shaft 24 is locked (as when valve 32 has reached a limit of its travel), rotational force from drive shaft 14 in, for example, a clockwise direction (FIG. 2) is transmitted to drive gear 44. Drive gear 44 is urged to rotate in a counterclockwise direction and, since input shaft 24 is locked, planetary gear and assembly 46 will transmit a rotational force in a clockwise rotation via its stator ring 52. In turn, stator ring 52 will urge bias shaft 20 in a counterclockwise direction. A spring 54, which comprises the preferred embodiment of bias member 18, is oriented within a stationary case 56 appropriately that counterclockwise rotation of bias shaft 20 serves to wind up spring 54 within case 56, thereby storing kinetic energy in bias member 18. During such winding up operations, brake 35 is controlled by logic/control member 36 via network 38 (FIG. 1) to remain deenergized, and coupling 37 rides with respect to bias shaft 20 in a manner similar to an idler gear or cam.

Figure 3:
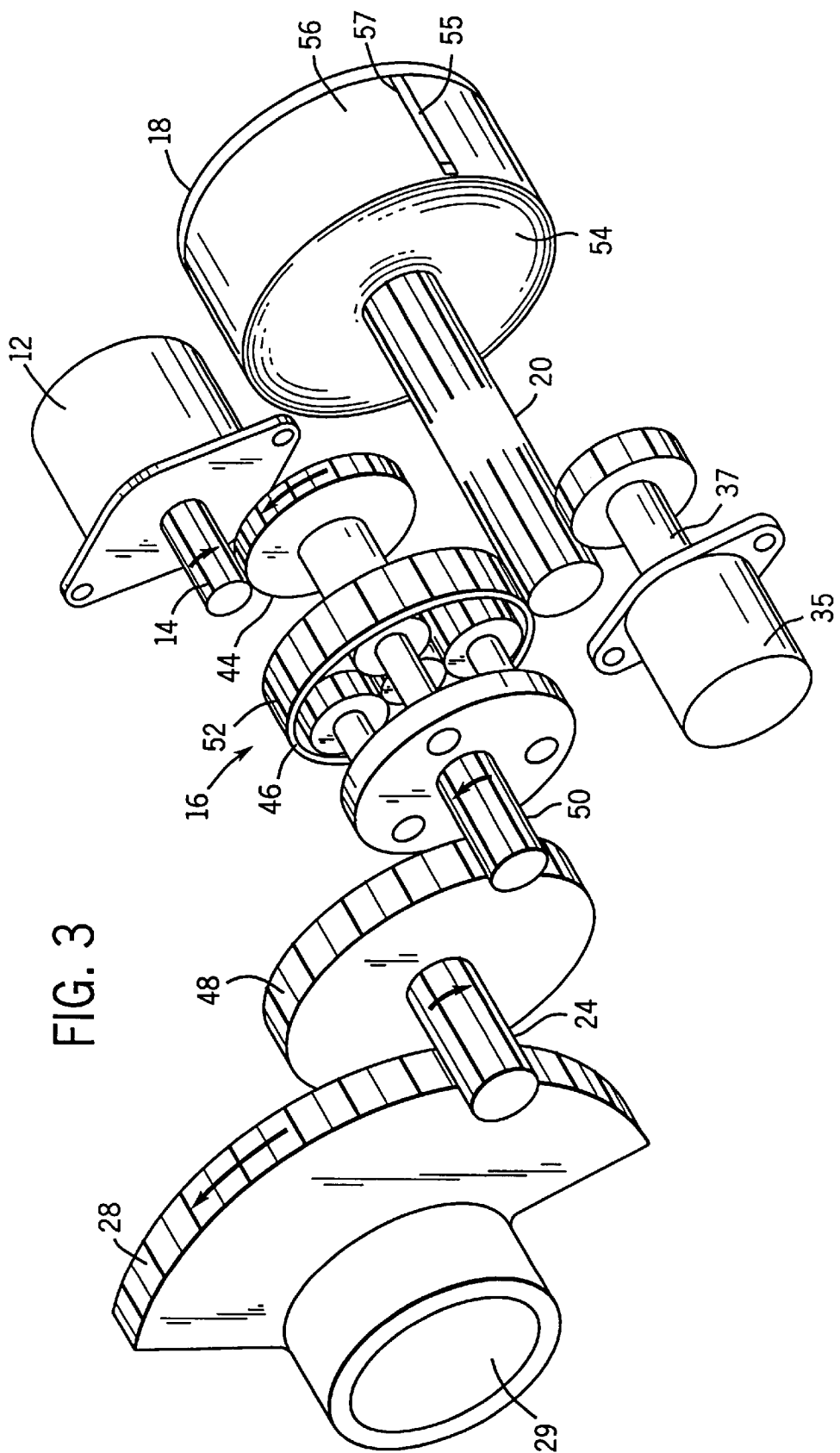
FIG. 3 is a schematic perspective illustration of details of the drive train of the preferred embodiment of the present invention during normal operation.

FIG. 3 is a schematic perspective illustration of details of the drive train of the preferred embodiment of the present invention during normal operation. In FIG. 3, spring 54 has been wound. Logic/control member 36 has sensed the state of spring 54 and has communicated via network 38 with brake 35 so that brake 35 is set. Coupling 37 interacts with bias shaft 20 to lock bias shaft 20 and prevent transmission of kinetic energy stored in spring 54 via bias shaft 20 to planetary gear head assembly 46. In such normal operation, valve 32 (FIG. 1) is freely moving between its home position and its set position, that is within its limits of travel. Thus, actuating shaft 34, engaging aperture 29 of coupling 28, is free to move in either a counterclockwise or a clockwise direction to open, close or otherwise position valve 32 within its limits of travel. Accordingly, for illustration purposes, in FIG. 3 drive motor 12 is rotating drive shaft 14 in a clockwise direction to urge drive gear 44 in a counterclockwise direction. Since bias shaft 20 is now locked against rotation by brake 35 and coupling 37, planetary gear head assembly 46 has its stator ring 52 locked and, therefore, transmits forces received via drive gear 34 to shaft 50. Shaft 50 rotates in a counterclockwise direction and interacts with transmission gear 48 to impart a clockwise rotation to input shaft 24. Input shaft 24 interacts with coupling 28 to impart a counterclockwise rotation to actuating shaft 34 (not shown in FIG. 3) interfitting in aperture 29 of coupling 28. Similarly, drive motor 12 may impart a counterclockwise rotation to drive shaft 14, and so long as valve 32 is still within its travel limits and thus no locking out of actuating shaft 34 occurs, such a counterclockwise rotation imparted to drive shaft 14 will result in a clockwise rotation of coupling 28 and clockwise rotation of actuating shaft 34.

Figure 4:
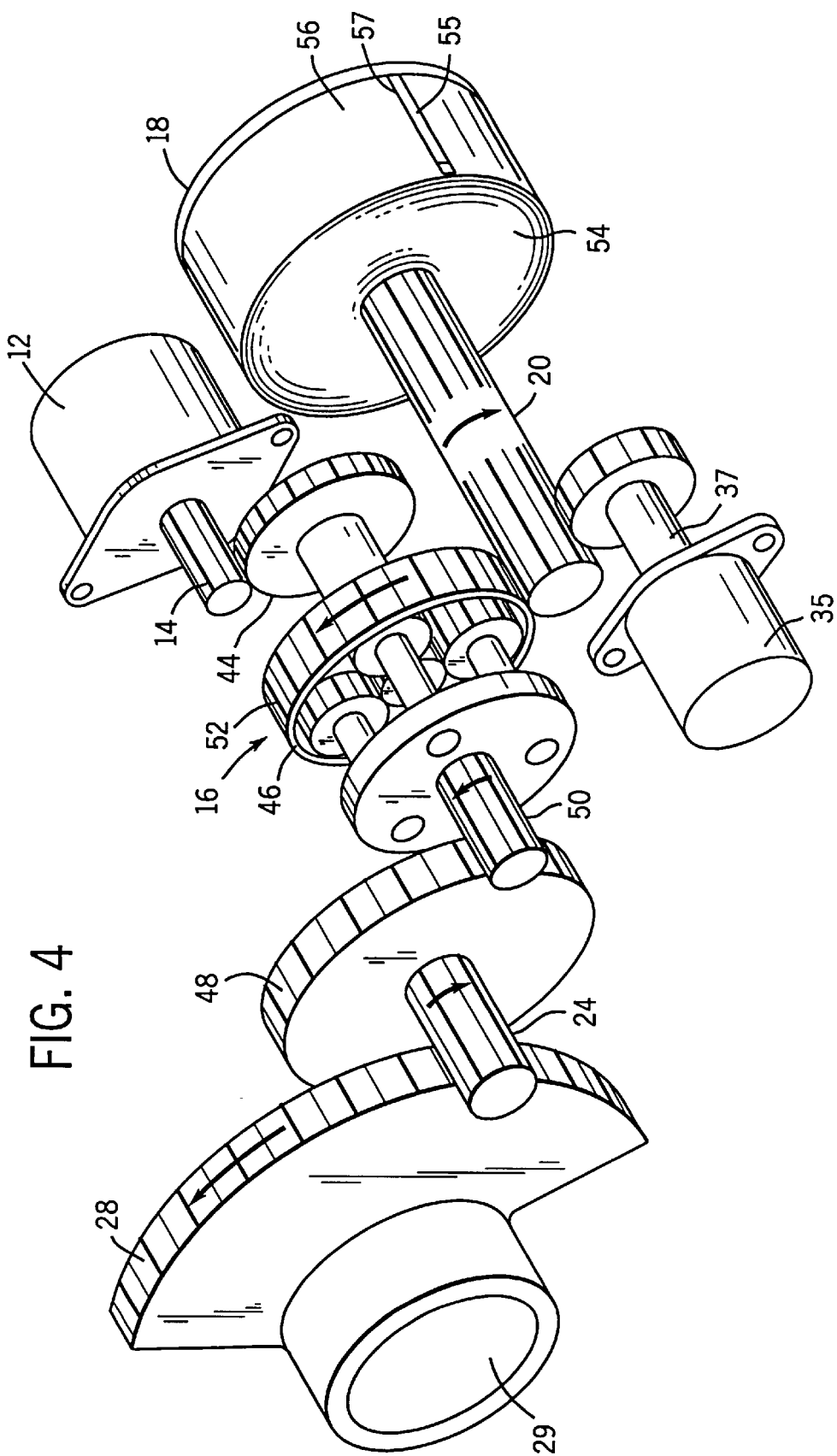
FIG. 4 is a schematic perspective illustration of details of the drive train of the preferred embodiment of the present invention when power is lost, the spring brake is released, and the spring is returning the valve or damper to the home position.

FIG. 4 is a schematic perspective illustration of details of the drive train in the preferred embodiment of the present invention when power is lost, the spring brake is released, and the spring is returning the valve or damper to the home position.

In FIG. 4, power has been lost to apparatus 10. The detent torque of drive motor 12 is designed to be sufficient to preclude turning drive shaft 14 by forces which may be applied to drive shaft 14 by the apparatus illustrated in FIG. 4 or by hand. Consequently, drive shaft 14 is effectively locked against rotation. The loss of power to drive motor 12 is sensed by logic/control device 36 via network 38, and logic/control device 36 effects unlocking of brake 35 via network 38 in response to such loss of power.

The return-to-normal cycle begins when power is lost to actuator 10. In an application when, for example, power is lost in a building, some valves and dampers must return to a home position to avoid damage to the building or discomfort to the building's occupants. Even though some return-to-normal actuators may have their brakes released by a logic/control device, it is more reliable to design the brake to release on its own upon loss of power. Thus, in the preferred embodiment of apparatus 10, brake 35 is a solenoid brake which is kept in an engaged (i.e., braking) orientation by the power supplied to apparatus 10. In such a configuration, loss of power to apparatus 10 automatically releases brake 35.

With brake 35 released, coupling 37 no longer locks bias shaft 20 and kinetic energy stored in spring 54 can now be released to impart a clockwise rotation to bias shaft 20 (note that the rotation to release kinetic energy (FIG. 4) is effected in a direction opposite to the direction of rotation of bias shaft 20 in imparting or storing kinetic energy in spring 54 (FIG. 2)). Clockwise rotation of bias shaft 20 is imparted to planetary gear head assembly 46 via its stator ring 52 urging stator ring 52 to rotate in a counterclockwise direction. Since drive shaft 14 is locked, drive gear 44 is locked, and, therefore, planetary gear head 46 transmits rotational force applied to its stator ring 52 to shaft 50 to rotate shaft 50 in a counterclockwise direction. Counterclockwise rotation of shaft 50 imparts a clockwise rotation to transmission gear 48 and input shaft 24 which, in turn, imparts a counterclockwise rotation to coupling 28. Consequently, actuating shaft 34 (not illustrated in FIG. 4) via its fitting within aperture 29, is rotated counterclockwise. It is preferred that such counterclockwise rotation of coupling 28 effect return of valve 32 to its predetermined home position (either normally open or normally closed) via rotation of actuating shaft 34.

Thus, a single drive motor 12 is used to transmit appropriate energy selectively to a bias member 18, such as a spring 54, or to an actuating shaft 34 via a coupling 28, depending upon whether input shaft 24 is locked or unlocked. Planetary gear head assembly 46 further operates to transmit bias force from bias member 18 when brake 35 is released, via bias shaft 20, through planetary gear head 46, to coupling 28 when drive shaft 14 is locked, such as when power is lost.

Figure 5A:
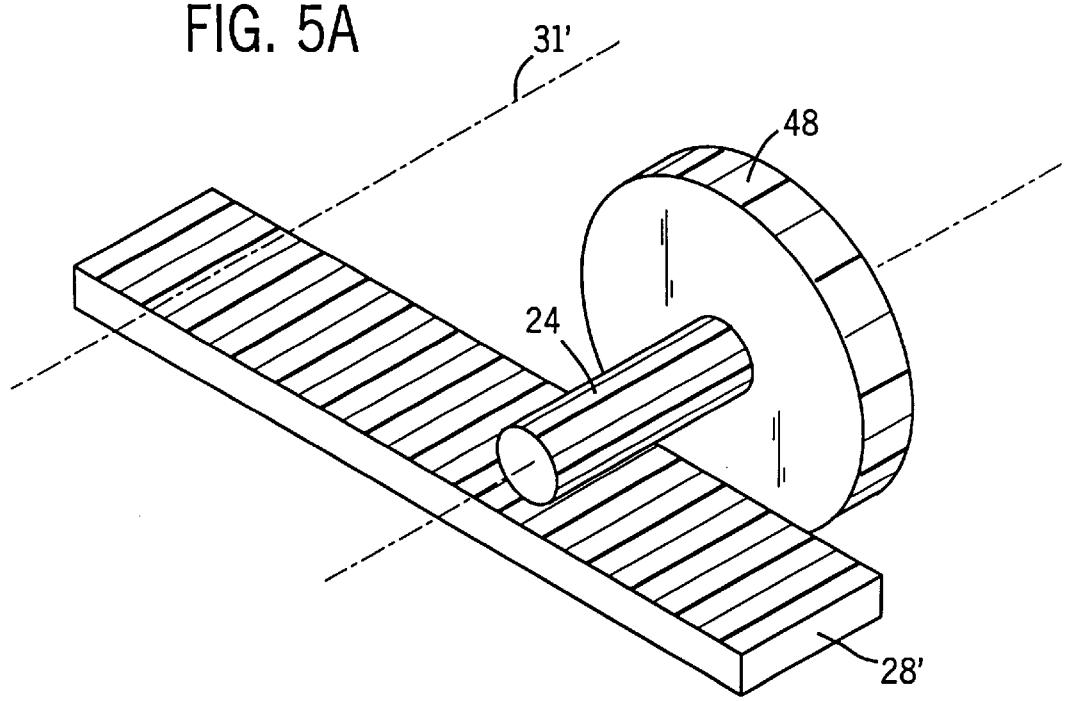
FIG. 5 is a schematic perspective illustration of alternate output arrangements available for use with the preferred embodiment of the present invention.
Figure 5B:
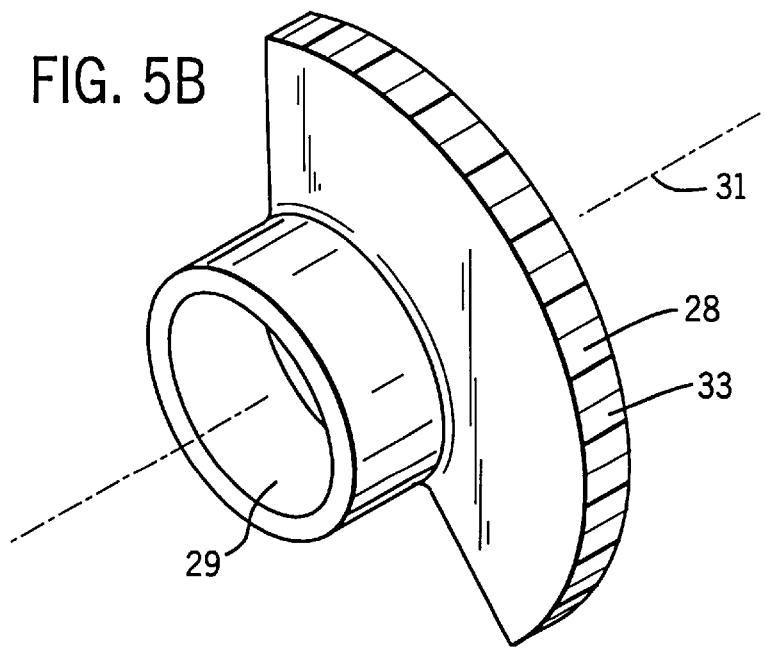

FIG. 5 is a schematic perspective illustration of alternate output arrangements available for use with the preferred embodiment of the present invention.

In FIG. 5, transmission gear 48 and its attached input shaft 24 are illustrated as being configured for providing input to a drive member 22 (FIG. 1) via a rack and pinion arrangement through a rack 28'. Thus, a pinion gear (illustrated schematically in FIG. 5) may be attached to or incorporated into input shaft 24, and rack 28' may be appropriately configured for engaging interaction with the pinion gear of input shaft 24 to provide a rack and pinion coupling to a drive member 22 for apparatus 10. Appropriate configuration of apparatus 10, with room to allow rack 28' to be slidingly disengaged from the pinion gear associated with input shaft 24, facilitates replacement of rack 28' with a sector gear coupling 28. Axis 31 of coupling 28 may be substantially aligned with an axis 31' to facilitate meshing engagement of a face 33 of coupling 28 with the pinion gear associated with input shaft 24. In such manner, quick change of an actuating arrangement between a rack and pinion coupling arrangement and a sector gear coupling arrangement may be easily and quickly effected.

Thus, the invention is a return-to-normal apparatus 10 usable for actuating devices such as a valve or damper 32.

Apparatus 10 initially winds an internal return spring 54 and then decouples spring 54 from input shaft 24 to drive member 22. Thus, a single drive motor 12 drives the load (e.g., valve 32) and only the load applied to input shaft 24 to drive member 22 during normal operation. Once power to apparatus 10 is removed, spring 54 is coupled to input shaft 24 and spring 54 drives valve 32 to its predetermined normal position, such as a normally open or a normally closed position. In its preferred embodiment, the apparatus has both a linear (e.g., rack and pinion) version and a rotary (e.g., sector gear) version. Apparatus 10 is preferably directly mounted to a valve or damper 32 and employs a small stepper motor and a spring, approximately 2¼ inches in diameter and ½ inch thick. Most parts from the linear version are used in the rotary version. Spring 54 moves only during the return-to-normal cycle, and during a subsequent recovery cycle when the spring is rewound.

Transmission member 16 includes a gearing mechanism, preferably in the form of a planetary gear head assembly 46, which splits the power from drive motor 12 in two paths: A first path to 110 input shaft 24, and a second path to bias shaft 20. When drive shaft 14 is locked, a third path is formed through planetary gear head assembly 46 between bias member 18 via bias shaft 20 and input shaft 24 to drive member 22.

In normal operation, after spring 54 has been wound, and that wound state is sensed by logic/control device 36 via network 38, spring 54 is held stationary by brake 35. Brake 35 is preferably embodied in a solenoid brake. Thus, in normal operation, drive motor 12 is free to actuate valve 32 (or damper) without having to wind and unwind spring 54. When drive member 22 is not being commanded to move, drive motor 12 has sufficient detent torque to hold valve 32 (or damper) in position.

Under return-to-normal operation (e.g., during power failure), brake 35 loses power, which loss of power is sensed by logic/control device 36 via network 38. As a result, logic/control device 36 releases solenoid brake 35 which consequently releases spring 54. Alternately, the solenoid of brake 35 may be directly powered by the power source for apparatus 10. In such case, a loss of electrical power will cut power to the solenoid, which will release brake 35. The detent torque of drive motor 12 is sufficient to prevent drive motor 12 from turning in response to the bias force applied to bias shaft 20 so that power from spring 54 is routed to input shaft 24, through drive member 22, thus returning valve 32 to its home position.

When power is restored after a power failure, or upon initial energization of apparatus 10, brake 35 is not immediately energized. First, spring 54 must be wound or rewound. This winding or rewinding is done by energizing drive motor 12 to move in a direction which urges valve 32 to its home position. Once valve 32 reaches its home position (a limit of its travel), input shaft 24 is effectively locked and power from drive motor 12 will be transferred to spring 54 (FIG. 2). Drive motor 12 then proceeds to wind up spring 54 a predetermined number of turns (controlled by logic/control device 36) to effect appropriate winding of spring 54. Preferably, spring 54 is only wound far enough to enable spring 54 to return valve 32 (or damper) to its home position. Torque produced by spring 54 increases as spring 54 is wound further. The more torque produced by spring 54, the greater the stress experienced by spring 54. Drive member 22 and spring 54 are designed for a maximum stroke, but most valves and dampers have stroke less than this maximum. Because logic/control device 36 "knows" what the stroke of valve 32 (or damper) actually is, winding spring 54 completely can be avoided. This will also reduce stresses on transmission member 16 and on valve 32 (or damper).

Once winding or rewinding is accomplished, brake 35 is energized to hold spring 54 in its wound position. Thus, in the preferred embodiment, brake 35, through coupling 37, engages and holds bias shaft 20 and effectively removes spring 54 from the power path through transmission member 16. That is, any further movement imparted by drive motor 12 to transmission member 16 via drive shaft 14 will now be transferred to input shaft 24 (FIG. 3).

Preferably, apparatus 10 is shipped with spring 54 completely unwound within its case 56. Further, apparatus 10 is preferably shipped with actuator shaft 34 at either of its extremes of travel. Input shaft 24, as previously described, will not be movable by hand because of the detent torque of drive motor 12.

After valve 32 (or damper) is attached to actuator shaft 34, apparatus 10 is ready to be turned on for the first time, and logic/control device 36 must execute an initialization routine. In such an initialization routine, it is presumed that spring 54 is completely unwound. Brake 35 is first energized to keep spring 54 from being wound. Drive motor 12 is energized in the direction that moves valve 32 away from the home position until drive motor 12 stalls. Logic/control device 36 assumes that the position at which drive motor 12 stalls is the extreme of valve 32 travel away from the home position. Drive motor 12 is then cycled in the opposite direction until it stalls. Logic/control device 36 presumes that this position of second stalling of drive motor 12 is the home position of valve 32.

Logic/control device 36 preferably counts steps from the position reached at extreme of travel away from the home position by valve 32 until valve 32 reached the home position. Thus, logic/control device 36 now "knows" that valve 32 (or damper) is in the home position, and further knows the number of steps to traverse a full stroke from one extreme of travel to the other extreme of travel by valve 32. Logic/control device 36 saves this stroke length in memory 40 (FIG. 1), preferably a permanent non-volatile memory.

After having cycled valve 32 back to the home position, as described above, the initialization routine continues as brake 35 is deenergized and drive motor 12 continues to turn in a direction to drive valve 32 to the home position. Since valve 32 is already home, motor power from drive motor 12 will be transferred by planetary gear head assembly 46 to bias shaft 20 and, ultimately, to spring 54 as described above. Thus, spring 54 will be wound. Drive motor 12 will turn bias shaft 20 a programmed number of turns to fully wind spring 54. At this point in the initialization routine, brake 35 is energized to lock spring 54 in position. This completes the initialization routine. If at any future time apparatus 10 is removed from valve 32, the initialization routine will have to be rerun.

It is important to note that brake 35 is not based on a separate DC motor, as in some prior art designs of such actuators. Brake 35 in the preferred embodiment of the present invention is based on a solenoid. One advantage of such a configuration is that brake 35 does not require circuitry to discharge a capacitor through drive motor 12 to release spring 54. Spring 54 is instead released automatically upon interruption of power to the solenoid associated with brake 35. Of course, it may be advisable to place a capacitor across the solenoid of brake 35 to prevent nuisance trips. Once brake 35 is released and spring 54 begins to return valve 32 to its home position, apparatus 10 preferably should be allowed to complete the return-to-normal cycle so that logic/control device 36 "knows" where spring 54 is and where valve 32 is.

A particular advantage of the preferred embodiment of the present invention is that it is possible to change the home position for stem-up or stem-down configuration, or to change from clockwise to counterclockwise actuation very easily. To facilitate such a change, spring 54 is generally shipped in an unwound condition. That is, spring 54 is loosely contained within case 56 and engages case 56 by a tab 55 in a slot 57. Thus, to change the action of apparatus 10 from one direction to another (e.g., from stem-up to stem-down, or from clockwise to counterclockwise), one must detach (or not yet have attached) apparatus 10 from valve 32. Power to apparatus 10 must be off, and spring 54 must be completely unwound. Tab 55 is disengaged from slot 57 to facilitate removal of spring 54 from case 56. Spring 54 may then be rotated 180 degrees, reinserted in case 56, and tab 55 reengaged with slot 57. In such manner, the direction for winding spring 54 is reversed so that the return-to-normal force provided by unwinding spring 54 and transmitted through bias shaft 20 is reversed. Apparatus 10 should, in such a configuration, provide a switch, or jumper, or other means by which an installer can indicate to logic/control device 36 in which direction the home position is located.

Figure 6:
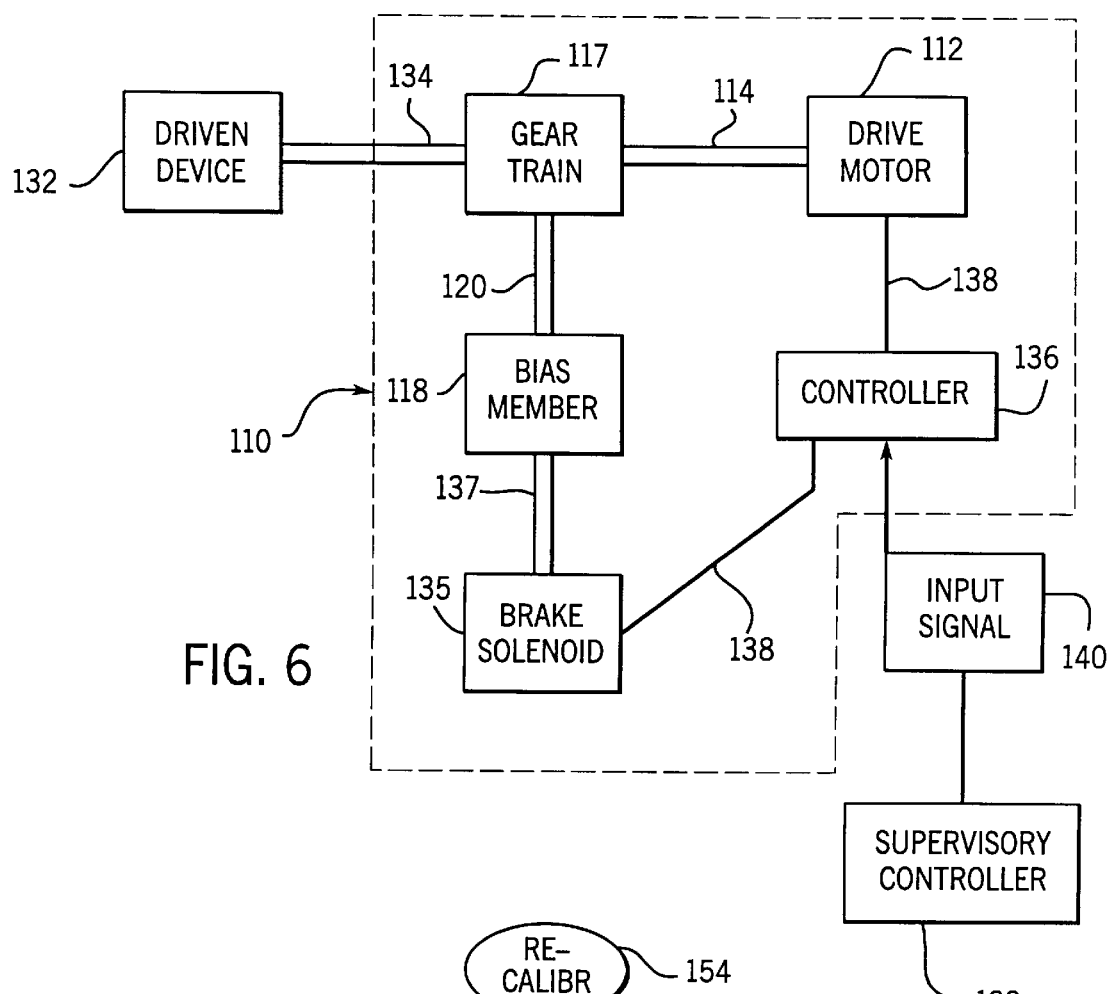
FIG. 6 is a schematic illustrating the components of the apparatus for effecting actuation of a positioning member.

In the particular embodiment of the present invention shown in FIG. 6, an actuator apparatus 110 that is substantially similar to the previously described apparatus 10 is illustrated to include a drive motor 112 adapted to selectively deliver a drive torque to one of a positioning member 134 and a bias member 118. Specifically, drive motor 112 is coupled to a gear train 117 via a coupler 114 such as a drive shaft. Gear train 117 is, in turn, coupled to positioning member 134 and to bias member 118 via second coupler 120. Gear train 117 is adapted to selectively convey the driving torque from drive motor 112 to one of the positioning member 134 and bias member 118 such as in the manner heretofore describe in regards to FIGS. 1–5. Bias member 118 is coupled to a brake solenoid 135 via a third coupler 137 and is adapted to return positioning member 134 to a first position upon loss of power.

Controller 136, as previously described, is adapted to selectively transmit positioning signals to drive motor 112 and brake solenoid 135 to effect positioning of positioning member 134 and bias signals to drive motor 112 to effect cocking of bias member 118. Drive motor 112 is adapted to selectively deliver a first output torque and a second output torque to gear train 117 in response to the positioning and biasing signals, respectively. As is described below, in the presence of the positioning signal, brake solenoid 135 prohibits rotation of bias member 118 such that gear train 117 actuates positioning member 134 while in the absence of the positioning signal, brake solenoid 135 does not prohibit movement of bias member 118.

Controller 136 communicates with drive motor 112 and brake solenoid 135, as is indicated in FIG. 6 by lines 138, in order to control the output torque of drive motor 112 and to ensure that gear train 117 causes movement of the proper one of the positioning member 134 and bias member 118. More particularly, to rotate positioning member 134, controller 136 sends a positioning signal to drive motor 112 and brake solenoid 135 whereby drive motor 112 generates the first output torque and brake solenoid 135 prevents cocking of bias member 118. In a similar fashion, controller 136 cocks bias member 118 by sending a bias signal to drive motor 112 whereby drive motor 112 generates the second output torque and gear train 117 drives bias member 118. It will be appreciated by those skilled in the art that, as previously described, controller 136 signals brake solenoid 135 to engage bias member 118 during normal operation of actuator apparatus 110. Accordingly, upon loss of power the positioning signal is discontinued, brake solenoid 135 disengages, and bias member 118 drives positioning member 134 to return driven device 132 to its home position.

It is contemplated that actuator 110 may be used as a stand alone unit capable of receiving an input signal 140 from a sensor, e.g., a thermostat, in response to which controller 136 selectively initiates rotation of positioning member 134 and/or movement of brake solenoid 135. Alternatively, actuator apparatus 110 may operate to control a single unit or condition within one of a plurality of zones or environments that are monitored by supervisory controller 139. In this embodiment, controller 136 sends signals to drive motor 112 and brake solenoid 135 in response to input signals 140 received from supervisory controller 139.

Figure 7:
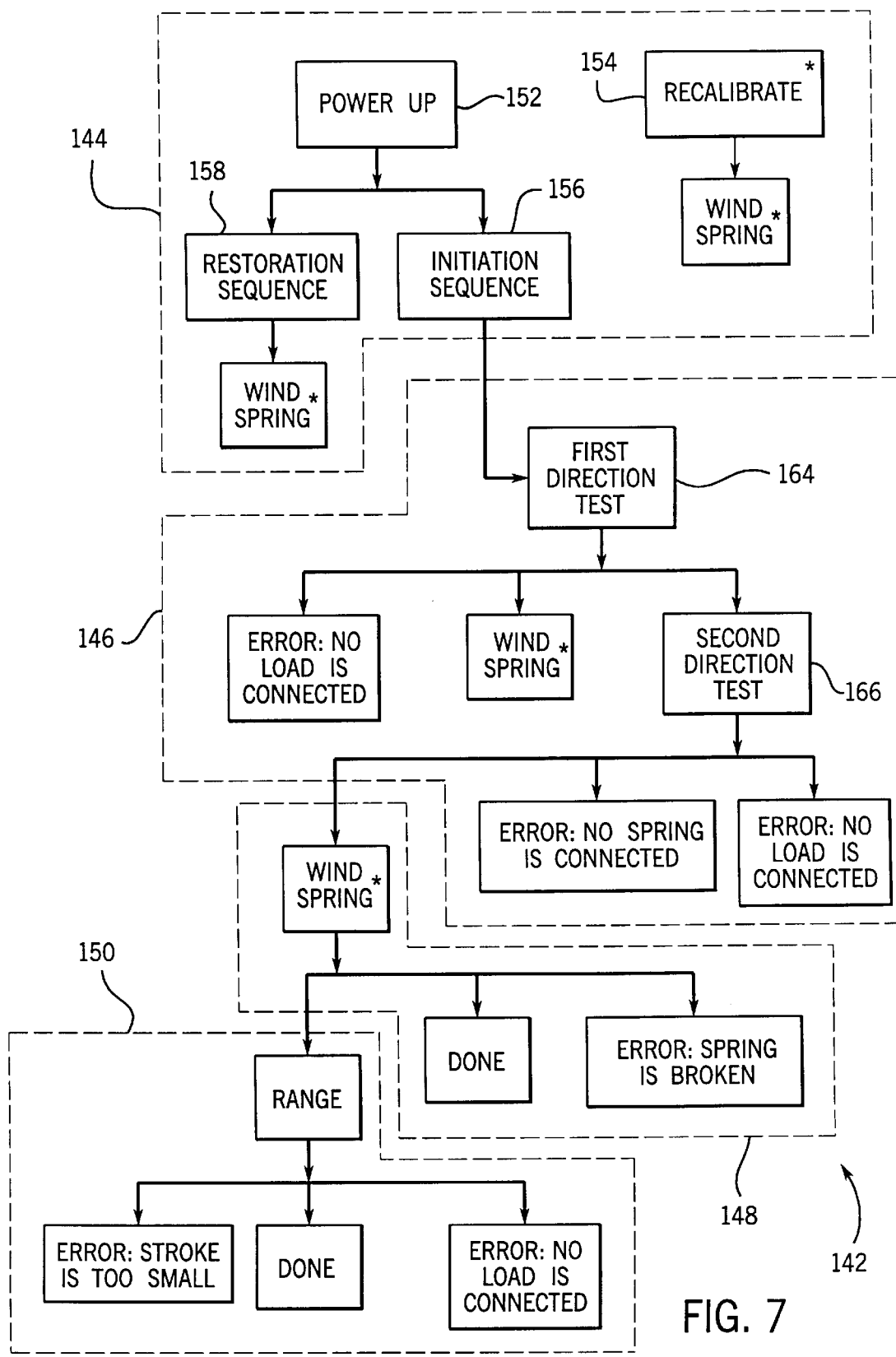
FIG. 7 is a schematic illustrating the sequences performed during commissioning of the apparatus including a calibration sequence, end stop determination sequence, wind spring sequence, and range sequence.

In the embodiment illustrated in FIGS. 6–13 and described in detail hereinafter, controller 136 is further adapted to determine the orientation of actuator 110 with respect to driven device 132, the home and end of travel positions of positioning member 134, and to monitor the positioning and rate of movement of positioning member 134 such that actuator 110 may be mounted to a driven device 132, e.g., a damper or a valve, without regard to the relative positions of positioning member 134 1–5 and driven device 132. The operation of controller 136 is generally shown in FIG. 7 and more particularly illustrated by the flow charts of FIGS. 8–12. Specifically, controller 136 includes an operator initiated commissioning sequence 142 whereby controller 136 is capable of automatically determining a first position of positioning member 134 commonly corresponding to a fully opened position of driven device 132 and a second position of positioning member 134 commonly corresponding to a fully closed position of driven device 132. It will be appreciated by those skilled in the art that the home position of driven device 132, i.e., the position in which positioning member 134 is urged by bias member 118 upon loss of power, can correspond to either the first fully opened or the second fully closed position.

Figure 12:
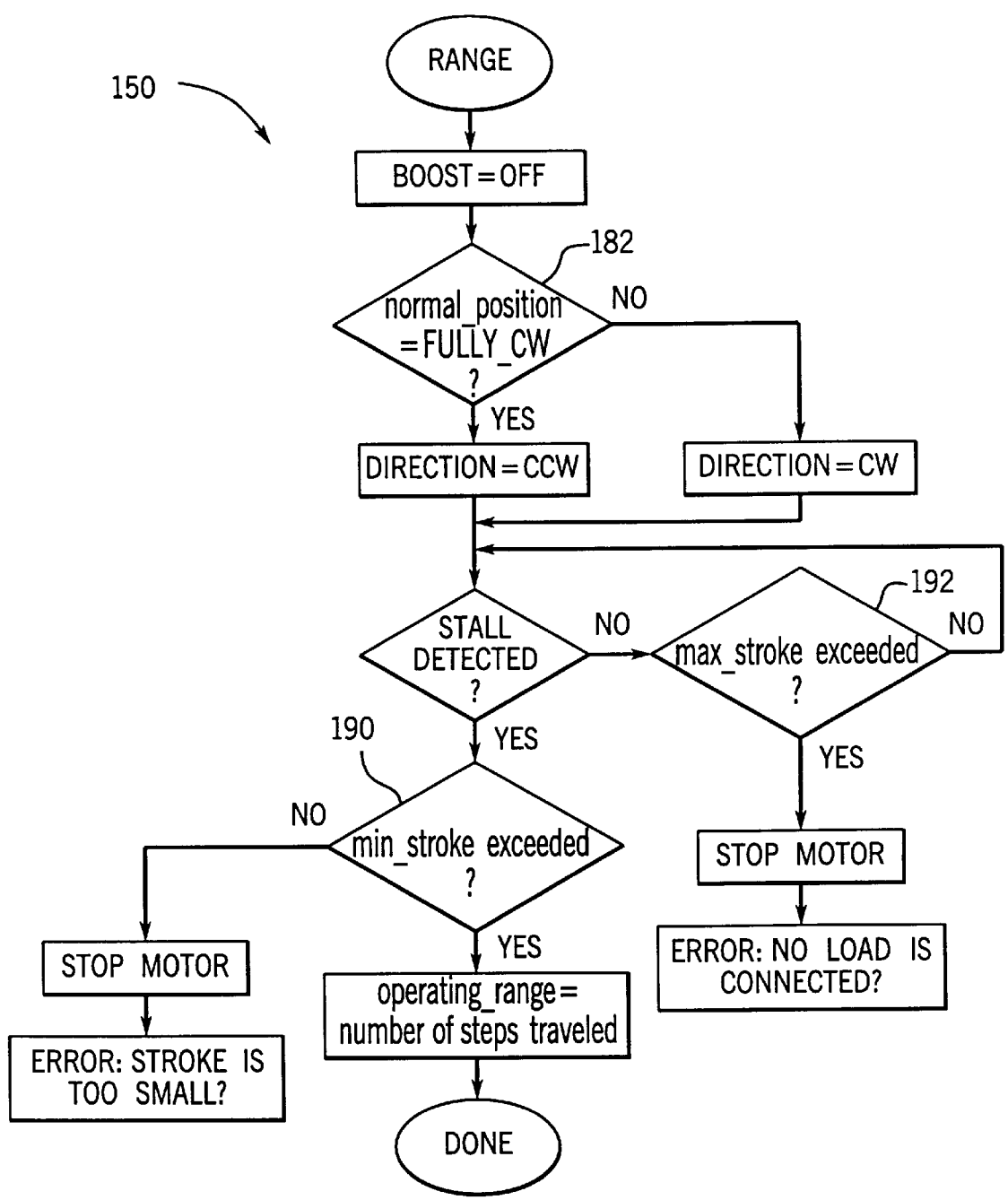
FIG. 12 is a schematic illustrating the steps performed during the range sequence illustrated in FIG. 7.

As best seen in FIG. 7, commissioning sequence 142 preferably includes a calibration sequence 144 (FIGS. 8 and 9), an end stop determination sequence 146 (FIGS. 9 and 10), a spring winding sequence 148 (FIG. 11), and a range finding sequence 150 (FIG. 12). With reference to FIGS. 7 and 9, commissioning sequence 142 is initiated with calibration sequence 144 which, in turn, begins with either a power up 152 or a recalibration 154 of controller 136. It is contemplated that power up 152 includes both an initiation sequence 156 and a restoration sequence 158 as shown in FIG. 7. Initiation sequence 156 is performed when actuator 110 is first powered up at which time an "operating range" parameter 160 and an "normal_position_is_programmed" parameter 162 are undetermined. As a result, calibration sequence 144 proceeds to first direction test 164 of end stop determination sequence 146 so as to determine the normally closed position, the operating range, and to wind the spring as described below.

During the subsequent operation of actuator 110, specific events initiate the remaining operations of calibration sequence 144, i.e., restoration sequence 158 and recalibration 154. More particularly, restoration sequence 158 is initiated when power is restored following an outage and recalibration 154 is initiated through operator manipulation of an interface mechanism in order to redetermine the actuator operating range and unwind and rewind the spring. As is explained in greater detail hereinafter, the parameters stored in the memory of the actuator following each operation of calibration sequence 144 dictate the subsequent operations performed by commissioning sequence 142.

Restoration sequence 158 does not reset any of the operating parameters when power is resupplied to controller 136. Rather, the non-volatile memory of controller 136 retains the various operating parameters during power failure and, as most clearly illustrated in FIG. 9, calibration sequence 144 proceeds from power up 152 to return the positioning member to the home position by unwinding the bias member without resetting "operating_range" parameter 160 to zero or "normal_position_is_programmed" parameter 162 to FALSE. Subsequently, bias member 118 is cocked through the steps of wind spring sequence 148 illustrated in FIG. 10.

Figure 8:
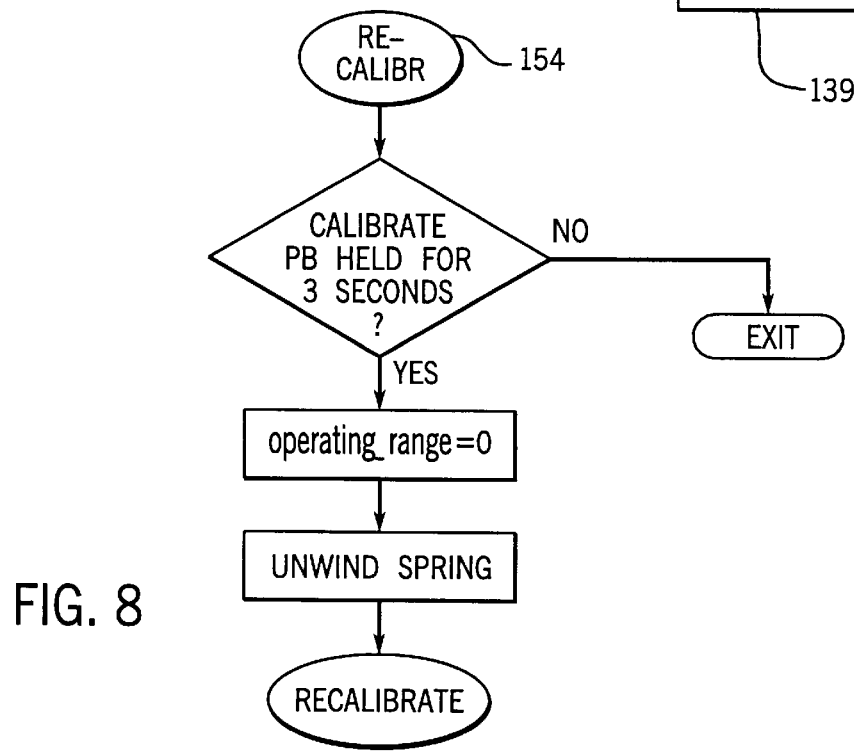
FIG. 8 is a schematic illustrating a recalibration sequence selectively performed during the calibration sequence illustrated in FIG. 7.
Figure 9:
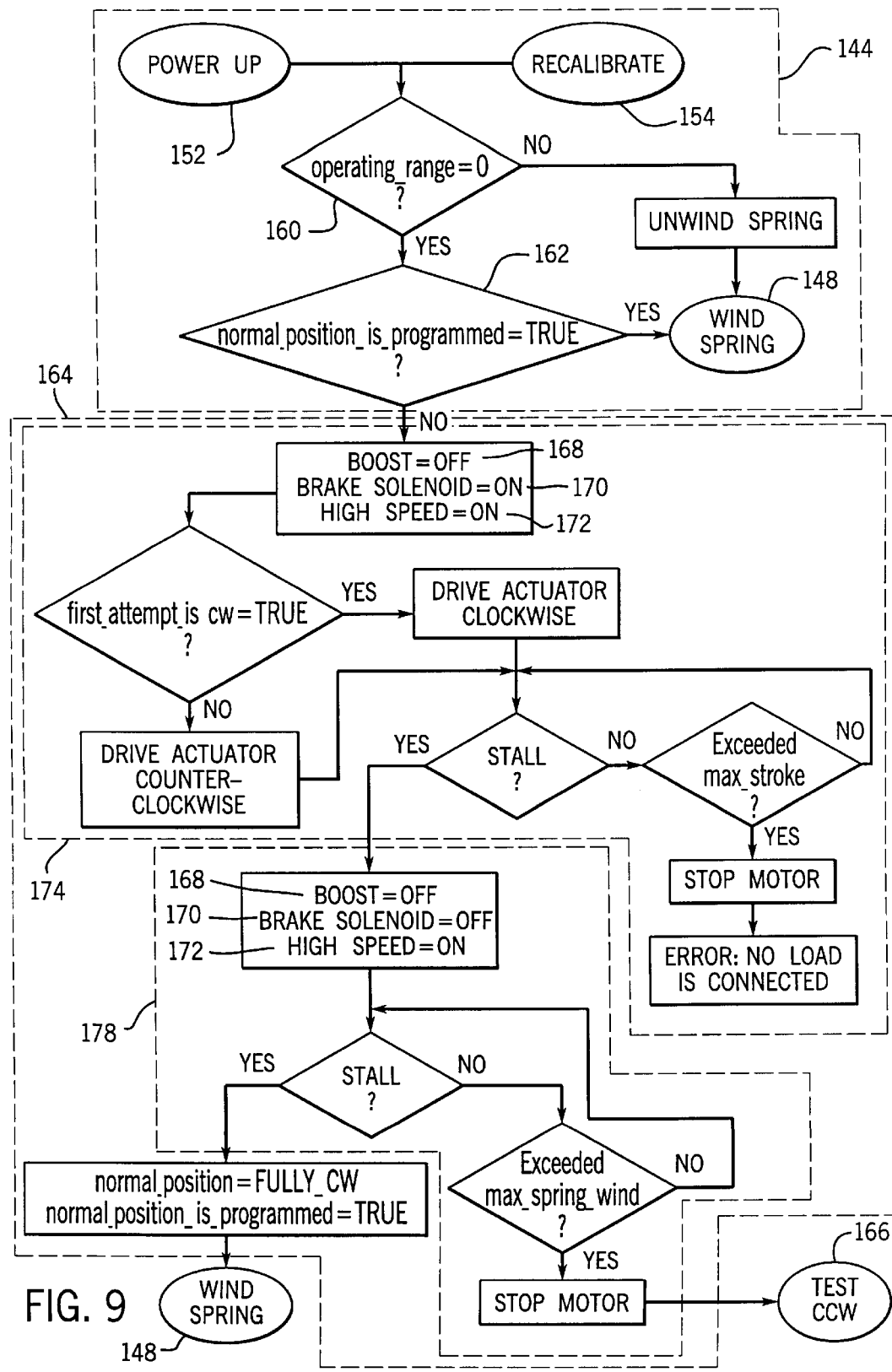
FIG. 9 is a schematic illustrating a first direction test sequence selectively performed during the end stop determination sequence illustrated in FIG. 7.

With reference to FIG. 8, recalibration 154 causes controller 136 to set "operating_range" parameter 160 to zero and uncock bias member 118 such as by disengaging brake solenoid 135 as previously described. Accordingly, with "operating_range" parameter 160 equal to zero and the "normal_position_is_programmed" parameter 162 being TRUE from the end stop determination conducted during initiation sequence 156, calibration sequence 144, as shown in FIG. 9, proceeds to wind the spring in the manner shown in FIG. 11. It is contemplated that an operator will select recalibration 154 when it is desired to reset the spring wind or "operating_range" parameter 160 while maintaining the previously determined parameters relating to the orientation of actuator apparatus 110 relative to driven device 132. In the preferred embodiment, an operator initiates recalibration 154 by retaining a calibrate push button (not shown) in an engaged position for at least three seconds. However, it should be appreciated that various equivalent initiation interfaces between the operator and controller 136 may be used without departing from the scope of the claimed invention. Moreover, as is also known in the art, input signals may be provided automatically in response to a maintenance schedule.

As best seen in FIG. 9, during calibration sequence 144, the controller software tests "operating_range" parameter 160 and, perhaps, "normal_position_is_programmed" parameter 162 to determine whether to initiate end stop determination sequence 146, place positioning member 134 in a fully closed position and rewind bias member 118, or to proceed to wind spring sequence 148 (FIG. 9). Specifically, if "operating_range" parameter 160 is equal to zero, calibration sequence 144 causes controller 136 to test "normal_position_is_programmed" parameter 162. If this parameter is TRUE, i.e., the orientation of the actuator with respect to driven device 132 has already been determined, commissioning sequence 142 proceeds to wind spring sequence 148. Conversely, if "normal_positioned_is_programmed" parameter 162 is FALSE, commissioning sequence 142 proceeds to a first direction test 164 of end stop determination sequence 146.

End stop determination sequence 146 is conducted following initiation sequence 156 in order to determine whether driven device 132 exerts a load on drive motor 112 when positioning member 134 is rotated in both a clockwise and counterclockwise direction as well as to determine the orientation of bias member 118. End stop determination sequence 146 is illustrated in FIG. 7 to generally include a first direction test 164 shown in detail in FIG. 9, and a second direction test 166 shown in FIG. 10. First and second direction tests 164 and 166, respectively, are each initiated by setting the operating parameters of "boost", "brake solenoid", and "high speed" to off, on, and on, respectively. It should be appreciated by those skilled in the art that "boost" parameter 168 relates to the torque produced by drive motor 112. Drive motor 112 generates the first torque for drive positioning member 134 when the boost is "off" and the second torque to effect cocking of bias member 18 when the boost is "on". Similarly, "brake solenoid" parameter 170 may be set to "on" or "off" whereby gear train 117 transmits the torque from drive motor 112 to positioning member 134 and to bias member 118, respectively, as previously explained. Finally, during the performance of commissioning sequence 142, "high speed" parameter 172 is set to its "on" position wherein the rotational speed of drive motor 112 is increased. In the preferred embodiment, setting the "high speed" parameter to "on" allows completion of commissioning sequence 142 in approximately half as long as it would take with drive motor 112 rotating at normal speed.

Figure 10:
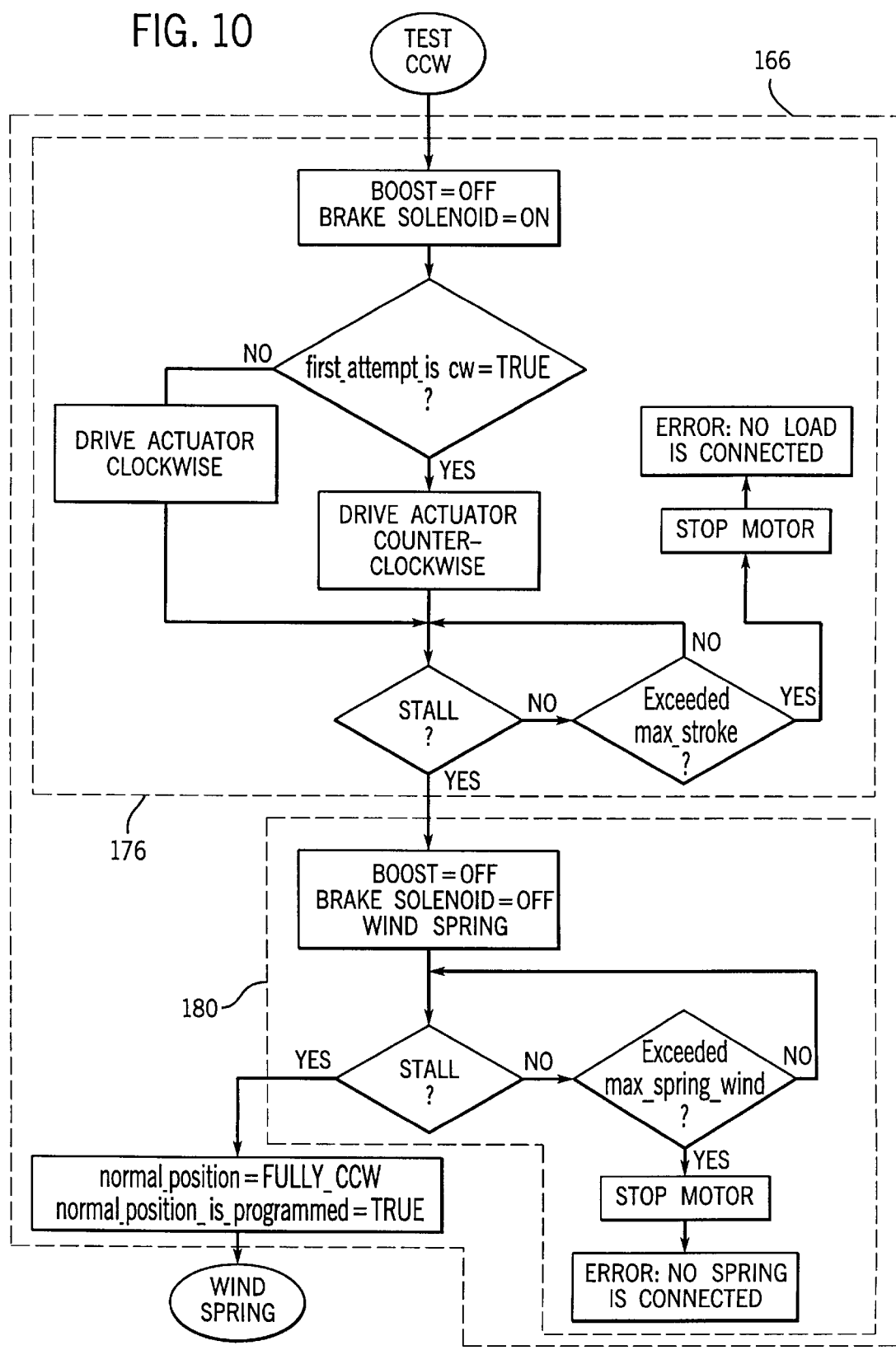
FIG. 10 is a schematic illustrating a second direction test sequence selectively performed during the end stop determination sequence illustrated in FIG. 7.
Figure 11:
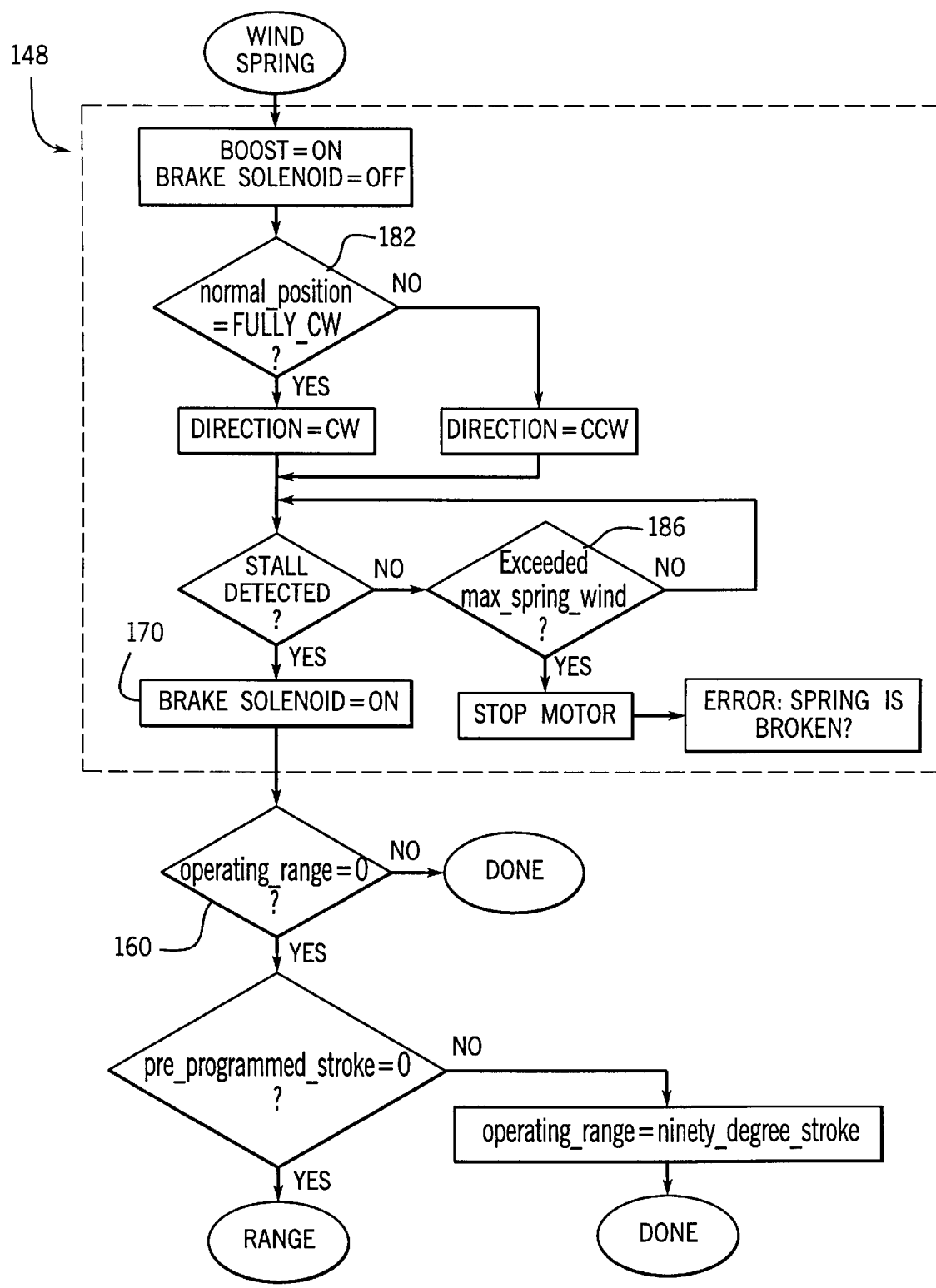
FIG. 11 is a schematic illustrating the steps performed during the wind spring sequence illustrated in FIG. 7.

As is illustrated in FIGS. 9 and 10, first and second direction tests 164 and 166, respectively, each include first and second load test sequences 174 and 176, respectively, and first and second spring test sequences 178 and 180, respectively. Load test sequences 174 and 176 determine whether driven device 132 exerts a load on positioning member 134 when positioning member 134 is rotated in a first and second direction, respectively. Similarly, spring test sequences 178 and 180 determine whether rotation of the drive motor 112 in the first and second directions, respectively, cocks bias member 118 when "brake solenoid" parameter 170 is in its "off" position, i.e., controller is sending the biasing signal to bias member 118 such that brake solenoid 135 is not preventing rotation of coupler 120.

As previously described, if actuator 110 is properly connected to driven device 132, the load test sequence and spring test sequence in one of the first and second directions will indicate that rotation of the drive motor 112 in the selected direction actuates a connected load when "brake solenoid" parameter 170 is "on" and cocks bias member 118 when "brake solenoid") parameter 170 is "off". In the preferred embodiment of the present invention, if this condition is encountered during first direction test 164, a "normal position" parameter 182 is set to FULLY CW, "normal position is programmed" parameter 162 is set to TRUE, and commissioning sequence 142 proceeds to wind spring sequence 148. However, if during load test sequence 174 a load is not detected before a "max stroke" parameter 184 is exceeded, controller 136 ceases sending the positioning signal, drive motor 112 stops, and controller 136 communicates an error message to the operator that indicates that no load is connected in the first direction. Likewise, if controller 136 does not detect bias member 118 prior to exceeding a "max spring wind" parameter 186, controller 136 again stops drive motor 112 and commissioning sequence 142 proceeds to second direction test 166.

In a similar fashion, when controller 136 detects a load and spring during second direction test 166, "normal position" parameter 182 is set to FULLY CCW, "normal position is programmed" parameter 162 is set to TRUE, and commissioning sequence 142 proceeds to wind spring sequence 148. However, if controller 136 does not detect a load before exceeding "max stroke" parameter 184, controller 136 ceases sending the positioning signal thereby causing drive motor 112 to stop. Controller 136 then generates an error message indicating that no load is connected in the second direction. Similarly, if during spring test sequence 180 bias member 118 is not detected before exceeding "max spring wind" parameter 186, drive motor 112 is stopped and controller 136 generates an error message indicating that no spring is connected.

Figure 13:
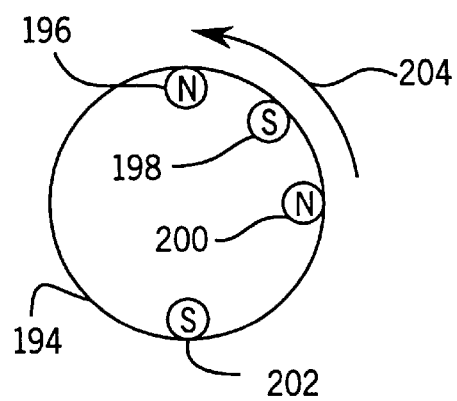
FIG. 13 is a top view of a magnetic disk connectable to the drive shaft of the apparatus.

In the preferred embodiment of the present invention, controller 136 determines whether a load and/or a spring is connected to the actuator by monitoring the direction of motor rotation and the motor speed in order to detect motor stall. Specifically, when the torque produced by drive motor 112 is insufficient to overcome the resistance of the connected load or spring, the motor will stall indicating that a load is connected to positioning member 134 or that bias member 118 is being wound by rotation of drive motor 112 in the selected direction. The preferred apparatus for detecting stalls in actuator 110 is shown in FIG. 13 to include a magnetic disk 194 with asymmetrical magnetic poles coupled for rotation with the shaft of drive motor 112. As will be appreciated by those skilled in the art, a bipolar hall-effect sensor communicates with magnetic disk 194 in order to generate a pulse train that indicates the direction and presence or absence of rotation of drive motor 112. Those skilled in the art will further appreciate that while the specific stall detection apparatus disclosed and claimed herein provides advantages over prior art techniques, a multitude of alternative stall detection assemblies are known in the art and adaptable for use with actuator apparatus 110 and controller 136. Specifically, it is contemplated that one such alternative includes coupling a magnetic disk having symmetrical poles for rotation with the drive motor shaft and placing two hall-effect sensors in communication therewith.

With continued references to FIG. 13, magnetic disk 194 is coupled for rotation with the drive motor shaft so as to trigger the bi-polar hall-effect sensor such that the sensor turns on (logic level "zero") in the presence of a magnetic south pole and turns off (logic level "one") when in the presence of a magnetic north pole. As will be appreciated by those skilled in the art, rotation of the drive motor shaft causes the hall-effect sensor to generate a pulse train that is based upon the orientation of the asymmetrical poles and unique to the direction of rotation of magnetic disk 194. Controller 136 is coupled for communication with the hall-effect sensor whereby the controller receives the pulse train from which the direction of drive motor rotation and the presence or absence of motor stall are identified.

Figure 14:
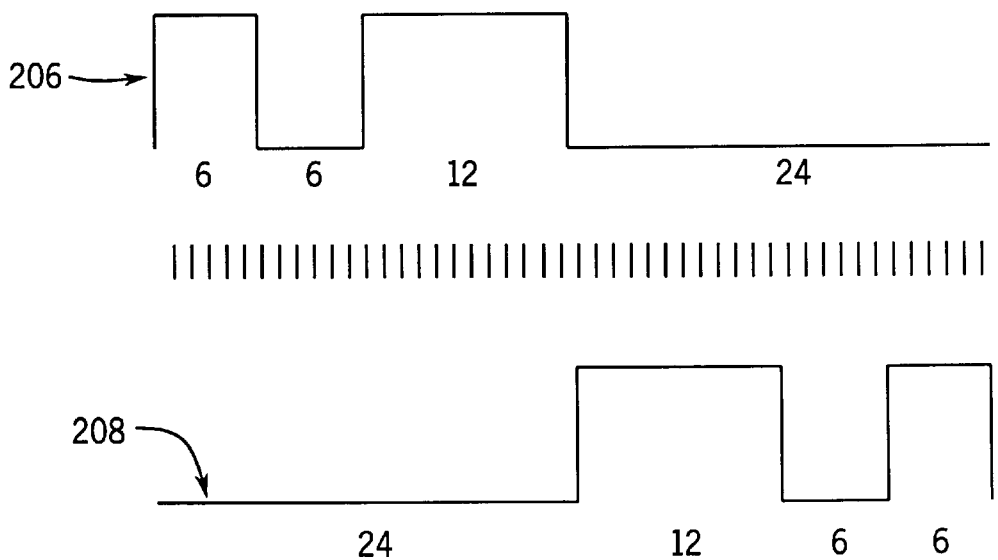
FIG. 14 is a diagram illustrating a first and second pulse train generated by the magnetic disk illustrated in FIG. 13.

The asymmetrical poles of magnetic disk 194 are preferably arranged such that a first north pole 196 is positioned opposite a second south pole 202, a second north pole 200 bisects the angular distance between first north pole 196 and second south pole 202, and a first south pole 198 bisects the angular distance between first and second north poles 196 and 200, respectively. When magnetic disk 194 rotates in a counter clockwise direction as indicated by arrow 204, this -o asymmetrical pole configuration generates a first pulse train 206 illustrated in FIG. 14. Similarly, a second pulse train 208 is communicated to controller 136 when disk 194 rotates in a clockwise direction. In the preferred embodiment, a full rotation of a magnetic disk 194 includes forty-eight stroke steps including six steps between first north pole 196 and first south pole 198, six steps between first south pole 198 and second north pole 200, twelve steps between second north pole 200 and second south pole 202, and twenty-four steps between second south pole 202 and first north pole 196.

As previously described, the preferred embodiment of the present invention includes a wind spring sequence 148 that is initiated after power up 152 or recalibration 154 if one of the following four conditions occur: "operating_range" parameter 160 does not equal zero; "operating_range" parameter 160 equals zero and "normal position is programmed" parameter 162 is TRUE; first direction test 164 indicates that a load is connected and bias member 118 is wound when drive motor 112 is rotated in the first direction; and when second direction test 166 indicates that a load is connected and bias member 118 is wound when drive motor 112 is rotated in the second direction. Wind spring sequence 148 includes the steps of placing "brake solenoid" parameter 170 in an "off" position and rotating drive motor 112 in the direction of "normal position" parameter 182. If controller 136 does not detect a stall prior to exceeding "max spring wind" parameter 186, controller 136 discontinues the biasing signal thereby stopping drive motor 112. Controller 136 then communicates an error message to the operator indicating that bias member 118 is broken. When controller 136 detects a stall prior to exceeding "max spring wind" parameter 186, it discontinues sending the biasing signal thereby engaging brake solenoid 135 and maintaining bias member 118 in its wound or cocked state.

Following engagement of brake solenoid 135, wind spring sequence 148 proceeds to determine whether "operating_range" parameter 160 or "pre-programmed stroke" parameter 188 are equal to zero. If so, these values are maintained and the program is complete. However, if "operating_range" parameter 160 and "pre-programmed stroke" parameter 188 each equal zero, commissioning sequence 142 proceeds to perform range sequence 150.

Range sequence 150 determines the number of rotational steps between the home positions and the end of travel position of positioning member 134. With "brake solenoid" parameter 170 still in the "on" position from wind spring sequence 148, controller 136 determines whether "normal position" parameter 182 is FULLY CW or FULLY CCW. Controller 136 then sends a positioning signal to drive motor 112 thereby causing drive motor 112 to generate the first drive torque in a direction opposite that indicated by "normal position" parameter 182. If controller 136 detects a stall between a "min stroke" parameter 190 and a "max stroke" parameter 192, the number of steps traveled is saved in the controller memory as "operating range" parameter 160. If controller 136 detects a stall prior to positioning member 134 rotating at least the value of "min stroke" parameter 190, controller 136 communicates an error message to the operator indicating that the stroke is too small for actuator 110. Similarly, if a stall is not detected before the rotational displacement of positioning member 134 exceeds the value of "max stroke" parameter 192, the operator is informed that no load is connected to positioning member 134.

By the completion of commissioning sequence 142, actuator apparatus 110 is configured to operate the specific driven member to which it is connected. An operator may at any time choose to reinitiate the commissioning sequence as previously described.

In the preferred embodiment of the present invention, a manual override is provided by which a pinon is attached to a thumb wheel (not shown) accessible to a user. When the thumb wheel is pushed in, the pinion engages one of the gears between drive motor 12 and planetary gear head assembly 46, and a lever applies braking pressure to return spring 54. If the thumb wheel is then turned, while still being pushed inward, drive motor 12 and valve 32 will also move (spring 43 being held stationary). In such manner, valve 32 can be moved manually whether or not there is power to apparatus 10. It is important to note that a user operating such a manual override with the present invention does not have to overcome the torque of spring 54, since spring 54 is locked by brake 35. A small catch near the thumb wheel can be used to latch the thumb wheel in place so that apparatus 10 can remain in a predetermined position indefinitely. If drive motor 12 starts to turn because of an application of electrical power while the manual override is in such a latched condition, the manual override is configured to automatically unlatch and apparatus 10 will then return to a normal non-override condition.

Further in the preferred embodiment of the present invention, apparatus 10 is converted from linear operation to rotary operation very simply as follows. Input shaft 24 has incorporated or mounted thereon a pinion gear (schematically illustrated in FIG. 5) for engaging a sector gear such as actuator 28 for rotary motion. Preferably, the frame of apparatus 10 is designed to attach either to a casting to which a valve is attached or to a casting enclosing a hollow output shaft and sector gear to which a damper is attached. Either casting may be attached to apparatus 10 with screw(s). Conversion from linear actuation to rotary actuation is accomplished simply by removing the casting which attaches to valves by removing appropriate screw(s), sliding out the rack assembly by using the manual override mechanism described above, and then attaching the casting which encloses the output shaft and sector gear by reinstalling appropriate screw(s). Any associated auxiliary switches, or feedback potentiometers, or other sensors associated with apparatus 10 must then be reset to correctly reflect the converted apparatus 10 as being mounted to a valve 32 or a damper.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

What is claimed is:

1. An apparatus for effecting actuation of a positioning member, the apparatus having a drive motor adapted to deliver driving torque to a gear train, the gear train adapted to selectively couple the driving torque to the positioning member, the apparatus comprising:
    a controller coupled to a drive motor and adapted to receive an input signal, the controller adapted to selectively apply positioning signals to the drive motor to effect positioning of the positioning member in response to the input signal, the controller further being adapted to selectively apply positioning signals to the drive motor to determine a first position and a second position of the positioning member, the first position comprises a home position and the second position comprises an end of travel.

2. The apparatus of claim 1 wherein the controller is adapted to provide a positioning signal to the drive motor for effecting actuation of the positioning member toward the first position and to monitor a response signal to determine when the positioning member is in the first position.

3. The apparatus of claim 2 wherein the controller is further adapted to provide a positioning signal to the drive motor for effecting actuation of the positioning member toward the second position and to monitor a response signal to determine when the positioning member is in the second position.

4. The apparatus of claim 3 wherein the response signal comprises a position sensor signal.

5. The apparatus of claim 3 wherein the response signal comprises a characteristic of the positioning signal.

6. The apparatus of claim 1 wherein the actuator is further coupled to a bias member, the bias member being adapted to return the positioning member to the first position upon a loss of power.

7. The apparatus of claim 6 wherein the controller is adapted to provide a bias signal to the drive motor and the bias member for effecting cocking of the bias member.

8. The apparatus of claim 6 wherein the drive motor provides a first driving torque output in response to the positioning signal and second driving torque output in response to the bias signal.

9. The apparatus of claim 6 wherein the bias member includes a brake member, the brake member adapted to permit cocking of the bias member in response to the bias signal and to prohibit uncocking of the bias member in the absence of the bias signal.

10. The apparatus of claim 9 wherein the brake member is responsive to the loss of power to permit uncocking of the bias member.

11. The apparatus of claim 1 wherein the controller is adapted to determine if the positioning member has exceeded one of the first and second positions.

12. The apparatus of claim 1 wherein the controller is coupled to a supervisory controller for receiving the input signal.

13. The apparatus of claim 1 wherein the controller is adapted to selectively redetermine the first and second positions in accordance with a maintenance schedule.

14. A method for commissioning a controller communicating with an apparatus for effecting actuation of a positioning member, said apparatus having a gear train for selectively coupling a drive motor to one of the positioning member and a bias member and means for detecting drive motor stall, said controller communicating with the drive motor, adapted to receive an input signal, and having a memory, said method comprising the steps of:
    (a) performing the following commissioning sequence:
        (a)(1) determining the presence of end stops and a bias member in response to receiving an end stop determination signal, including:
            (a)(1)(A) rotating said positioning member in a first direction, monitoring the rotation of the positioning member in said first direction to detect a stall, proceeding to step (a)(1)(B) if a stall is detected and proceeding to step (b) if a stall is not detected prior to positioning member exceeding a first position;
            (a)(1)(B) rotating said bias member in said first direction, monitoring the rotation of said bias member to detect a stall, proceeding to step (a)(1)(C) if a stall is not detected prior to bias member exceeding a first position, and storing said first direction as a normal position parameter in said memory and proceeding to step (a)(2) if a stall is detected;
            (a)(1)(C) rotating the positioning member in a second direction, monitoring the rotation of the positioning member to detect a stall, proceeding to step (a)(1)(D) if a stall is detected, and proceeding to step (b) if a stall is not detected prior to positioning member exceeding a second position; and
            (a)(1)(D) rotating said bias member in said second direction, monitoring the rotation of the bias member to detect a stall, storing said first direction as a normal position parameter in said memory and proceeding to step (a)(2) if a stall is detected, and proceeding to step (b) if a stall is not detected prior to bias member exceeding a second position;

(a)(2) winding said bias member including accessing an operating_range parameter and a stroke parameter from said memory, proceeding to step (b) if one of the operating_range parameter and the stroke parameter is not zero, and proceeding to step (a)(3) if said operating_range parameter and said stroke parameter are equal to zero;

(a)(3) determining a range of rotation for said positioning member and proceeding to step (b); and (b) terminating the commissioning sequence.

15. The method of claim 14 wherein the means for detecting drive motor stall includes means for generating a response signal indicating the direction and presence of rotation of said drive motor and wherein said controller is adapted to receive said response signal.

16. The method of claim 15 wherein said drive motor includes a drive shaft, wherein said means for generating a response signal includes a magnetic disk coupled for rotation with said drive shaft and a sensor communicating with said magnetic disk and said controller, and wherein said magnetic disk includes a plurality of asymmetrical poles whereby said sensor communicates a first pulse train to said controller when said drive motor rotates said drive shaft in said first direction and a second pulse train when said drive motor rotates said drive shaft in said second direction.

17. The method of claim 15 wherein the step of monitoring the rotation of the position member and the step of monitoring the rotation of the bias member each include monitoring the response signal generated by said drive motor.

18. The method of claim 14 wherein the step of rotating the positioning member includes sending a positioning signal to said drive motor and said bias member whereby said gear train couples said drive motor to said positioning member.

19. The method of claim 14 wherein the step of rotating the bias member includes sending a bias signal to said drive motor and said bias member whereby said gear train couples the drive motor to said bias member.

20. The method of claim 14 wherein the step of winding said bias member includes coupling said drive motor to said bias member, accessing said normal position parameter, rotating the bias member in the one of said first and second directions indicated by said normal position parameter, monitoring the rotation of said bias member, and sending a positioning signal to said bias member if a stall is detected.

21. The method of claim 20 wherein the step of winding said bias member further includes generating a signal to indicate that the bias means is broken if no stall is detected.

22. The method of claim 14 wherein the step of determining a range of rotation for said positioning member includes placing the positioning member in a home position, rotating said positioning member in one of said first and second directions until said positioning member stalls, and recording the stalled position of said positioning member relative to said home position in said memory.

23. The method of claim 14 wherein said apparatus further includes means for generating an input signal and wherein said input signal initiates a calibration sequence that selectively generates one of said end stop determination signal, wind spring signal, and range signal.

24. The method of claim 14 wherein said calibration sequence includes a first calibration sequence, a second calibration sequence, and a recalibration sequence and wherein at least one of said first calibration sequence, second calibration sequence, and recalibration sequence generates one of said end stop determination signal, wind spring signal, and range signal.

25. The method of claim 14 wherein the step of rotating the positioning member in said first direction further includes generating a signal to indicate that no load is connected when a stall is not detected prior to positioning member exceeding said first position.

* * * * *